(12) United States Patent
Cheng et al.

(10) Patent No.: US 10,671,851 B2
(45) Date of Patent: Jun. 2, 2020

(54) DETERMINING RECOMMENDED OBJECT

(71) Applicant: Alibaba Group Holding Limited, Grand Cayman (KY)

(72) Inventors: Zhiqi Cheng, Beijing (CN); Yang Liu, Beijing (CN); Xiansheng Hua, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 218 days.

(21) Appl. No.: 15/903,751

(22) Filed: Feb. 23, 2018

(65) Prior Publication Data

US 2018/0247129 A1    Aug. 30, 2018

(30) Foreign Application Priority Data

Feb. 24, 2017  (CN) .......................... 2017 1 0102422

(51) Int. Cl.
| | |
|---|---|
| *G06K 9/00* | (2006.01) |
| *G06F 16/783* | (2019.01) |
| *G06K 9/62* | (2006.01) |
| *G06F 16/735* | (2019.01) |

(52) U.S. Cl.
CPC ....... *G06K 9/00718* (2013.01); *G06F 16/735* (2019.01); *G06F 16/7837* (2019.01); *G06K 9/00664* (2013.01); *G06K 9/00744* (2013.01); *G06K 9/00751* (2013.01); *G06K 9/00758* (2013.01); *G06K 9/00765* (2013.01); *G06K 9/6215* (2013.01)

(58) Field of Classification Search
CPC ........... G06K 9/00718; G06K 9/00751; G06K 9/00664; G06K 9/00758; G06K 9/00765; G06K 9/6215; G06K 9/00744; G06F 16/7837; G06F 16/735; G06Q 30/0603
See application file for complete search history.

(56) References Cited

U.S. PATENT DOCUMENTS

| | | |
|---|---|---|
| 9,443,320 B1 | 9/2016 | Gaidon et al. |
| 2010/0142914 A1 | 6/2010 | Zhao |
| 2014/0161314 A1 | 6/2014 | Ostrovsky-Berman et al. |
| 2014/0279288 A1 | 9/2014 | Wouk |
| 2015/0139610 A1 | 5/2015 | Syed et al. |
| 2016/0378790 A1 | 12/2016 | Besehanic |
| 2018/0089203 A1 | 3/2018 | Soni et al. |

FOREIGN PATENT DOCUMENTS

WO    WO2009113102    9/2009

OTHER PUBLICATIONS

The PCT Search Report and Written Opinion dated Apr. 13, 2018, for PCT Application No. PCT/US18/19446, 11 pages.

*Primary Examiner* — Siamak Harandi
(74) *Attorney, Agent, or Firm* — Lee & Hayes, P.C.

(57) ABSTRACT

A recommended object determination method includes: acquiring at least one key frame corresponding to video data, the key frame being a video frame that validly identifies an in-frame object; performing an object detection operation on a first key frame among the key frames to determine object information associated with the first key frame, the object information including: object semantic information and object visual information; and determining candidate objects based on the object semantic information, and obtaining a recommended object associated with the first key frame by screening the candidate objects based on the object visual information. A user may be provided with a object precisely associated with video content, thus improving user experience.

20 Claims, 9 Drawing Sheets

ACQUIRE AT LEAST ONE KEY FRAME CORRESPONDING TO VIDEO DATA, KEY FRAME BEING VIDEO FRAME THAT VALIDLY IDENTIFIES IN-FRAME OBJECT
S702

PERFORM OBJECT DETECTION OPERATION ON FIRST KEY FRAMES TO DETERMINE OBJECT INFORMATION ASSOCIATED WITH FIRST KEY FRAME, OBJECT INFORMATION INCLUDING OBJECT SEMANTIC INFORMATION AND OBJECT VISUAL INFORMATION
S704

DETERMINE CANDIDATE OBJECTS BASED ON OBJECT SEMANTIC INFORMATION, AND OBTAIN RECOMMENDED OBJECT ASSOCIATED WITH FIRST KEY FRAME BY SCREENING CANDIDATE OBJECTS BASED ON OBJECT VISUAL INFORMATION
S706

FIG. 7

DETERMINING RECOMMENDED OBJECT

CROSS REFERENCE TO RELATED PATENT APPLICATIONS

This application claims priority to Chinese Patent Application No. 201710102422.3, filed on 24 Feb. 2017 and entitled "METHOD, APPARATUS, AND COMPUTER READABLE MEDIA FOR DETERMINING RECOMMENDING OBJECT", which is incorporated herein by reference in its entirety.

TECHNICAL FIELD

The present disclosure relates to the field of Internet information processing technologies, and, in particular, to recommended object determination methods and apparatuses, and computer readable media.

BACKGROUND

With the development of the age of Internet consumption, more and more people are choosing to purchase commodities via an e-commerce platform such as an e-commerce websites. An e-commerce website usually recommends a commodity to a user that the user might be interested, through inference based on transaction data, browsing data, and the like in the e-commerce website.

A video content-based data processing technology is required for the e-commerce website such as a video e-commerce system (hereinafter referred to as a target website) to provide users with shopping services that use videos as portals so that commodities associated with objects appearing in various scenarios in the videos are provided to the users.

An existing video content-based recommended object determination method mainly includes: firstly performing an object detection operation and a scenario classification operation on video key frames of a video file viewed by a user to obtain object labels and scenario labels corresponding to the video key frames; querying a commodity library by using the obtained object and scenario labels as query terms; then ranking search results based on correlations; finally merging various ranked results based on a rule to obtain a final association result, and recommending the association result as a recommended object to the user.

The conventional techniques have at least the following problems:

The existing recommended object determination method obtains a query result mainly based on text retrieval, and ambiguity and disorder may often occur in the association result due to many ambiguities included in the text content. Therefore, the existing recommended object determination method may not be able to provide a user with an object precisely associated with video content when recommending an object to the user based on the video content, resulting in poor user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides recommended object determination methods and apparatuses, and computer readable media, which provide a user with an object precisely associated with video content, thus improving user experience.

To solve the above technical problem, a recommended object determination method and apparatus, and computer readable media provided by the example embodiments of the present disclosure are implemented as follows:

A recommended object determination method includes:

acquiring at least one key frame corresponding to video data, the key frame being a video frame that validly identifies an in-frame object;

performing an object detection operation on a first key frame among the key frames to determine object information associated with the first key frame, the object information including object semantic information and object visual information; and determining candidate objects based on the object semantic information, and obtaining a recommended object associated with the first key frame by screening the candidate objects based on the object visual information.

In an example solution, the recommended object determination method further includes:

performing a scenario classification operation on each of the key frames to determine scenario semantic information of each of the key frames;

determining key frame semantic information of the key frames based on the scenario semantic information and the object semantic information of the key frames;

calculating a similarity degree between any two of the key frames based on the display content of the key frames and the key frame semantic information of the key frames; and determining one or more key frames associated with the recommended object based on the similarity degrees between the key frames and the recommended object associated with the first key frame.

In an example solution, the recommended object determination method further includes:

acquiring website object information, the website object information including semantic information of website objects and visual information of the website objects;

calculating similarity degrees between the website objects based on the website object information; and determining a second recommended object associated with the first key frame in the key frames based on the similarity degrees of the website objects and the recommended object associated with the first key frame.

A recommended object determination apparatus including:

a key frame acquisition module configured to acquire at least one key frame corresponding to video data, the key frame being a video frame that validly identifies an in-frame object;

an object information determination module configured to perform an object detection operation on a first key frame among the key frames to determine object information associated with the first key frame, the object information including object semantic information and object visual information, and the first key frame being any of the key frames; and a recommended object determination module configured to determine candidate objects based on the object semantic information, and obtain a recommended object associated with the first key frame by screening the candidate objects based on the object visual information.

In an example solution, the recommended object determination apparatus further includes a key frame association module configured to perform a scenario classification operation on each of the key frames to determine scenario semantic information of each of the key frames; determine key frame semantic information of the key frames based on the scenario semantic information and the object semantic information of the key frames; calculate a similarity degree between any two of the key frames based on the display content of the key frames and the key frame semantic information of the key frames; and determine one or more key frames associated with the recommended object based on the similarity degrees between the key frames and the recommended object associated with the first key frame.

In an example solution, the recommended object determination apparatus further includes an object association module configured to acquire website object information, the website object information including: semantic information of website objects and visual information of the website objects; calculate similarity degrees between the website objects based on the website object information; and determine a second recommended object associated with the first key frame in the key frames based on the similarity degrees of the website objects and the recommended object associated with the first key frame.

Computer readable media storing thereon computer-readable instructions that, when executed by one or more processors, cause the one or more processors to perform first acts comprising:

acquiring at least one key frame corresponding to video data, the key frame being a video frame that validly identifies an in-frame object;

performing an object detection operation on a first key frame among the key frames to determine object information associated with the first key frame, the object information including: object semantic information and object visual information; and determining candidate objects based on the object semantic information, and obtaining a recommended object associated with the first key frame by screening the candidate objects based on the object visual information.

In an example solution, the acts further comprise:

performing a scenario classification operation on each of the key frames to determine scenario semantic information of each of the key frames;

determining key frame semantic information of the key frames based on the scenario semantic information and the object semantic information of the key frames;

calculating a similarity degree between any two of the key frames based on the display content of the key frames and the key frame semantic information of the key frames; and determining one or more key frames associated with the recommended object based on the similarity degrees between the key frames and the recommended object associated with the first key frame.

In an example solution, the acts further comprise:

acquiring website object information, the website object information including: semantic information of website objects and visual information of the website objects;

calculating similarity degrees between the website objects based on the website object information; and determining a second recommended object associated with the first key frame in the key frames based on the similarity degrees of the website objects and the recommended object associated with the first key frame.

As shown from the technical solutions provided in the example embodiments of the present disclosure, the recommended object determination method and apparatus and the computer readable media provided in the example embodiments of the present disclosure consider both semantic information and visual information of objects when searching for a recommended object by using detected in-frame objects, thereby guaranteeing that an object provided for the user is precisely correlated to video content semantically and visually. In an example solution, multiple key frames having high similarity degrees may be obtained by calculating similarity degrees between the key frames. When an object is used as an associated object of a key frame, the associated object may be associated with the multiple key frames having high similarity degrees, so that similar key frames have a same associated object, thereby guaranteeing that more comprehensive associated objects may be provided for the user by each key frame and improving user experience. In an example solution, multiple website objects having high similarity degrees may be obtained by calculating similarity degrees between the website objects. When a website object is used as an associated object of a key frame, the multiple website objects having high similarity degrees with the website object may be used as objects associated with the key frame, thereby guaranteeing that more abundant associated objects may be provided for the user by each key frame and improving user experience.

BRIEF DESCRIPTION OF THE DRAWINGS

To illustrate the technical solutions in the example embodiments of the present disclosure more clearly, the accompanying drawings for describing the example embodiments will be briefly introduced in the following. Apparently, the accompanying drawings in the following description are only some example embodiments of the present disclosure. Those of ordinary skill in the art may further obtain other drawings according to these accompanying drawings without creative efforts.

FIG. 7 is a flowchart of an example recommended object determination method according to the present disclosure;

DETAILED DESCRIPTION

The example embodiments of the present disclosure provide recommended object determination methods and apparatuses, and computer readable media.

To enable those skilled in the art to better understand the technical solutions in the present disclosure, the technical solutions in the example embodiments of the present disclosure will be clearly and completely described in the following, with reference to the accompanying drawings in the example embodiments of the present disclosure. It is apparent that, the example embodiments described are merely some of rather than all of the example embodiments of the present disclosure. All other example embodiments obtained by those of ordinary skill in the art based on the example embodiments in the present disclosure without creative efforts should be encompassed in the protection scope of the present disclosure.

In an implementation manner of a recommended object determination method, at least one key frame corresponding to video data may be acquired first.

Generally, the key frame is equivalent to a key-animator in a two-dimensional animation, and may refer to a frame where a key action in a motion or change of a character or an object locates. In this solution, the key frame may be a video frame that validly identifies an in-frame object. The key frame may further validly identify an in-frame scenario.

Figure 1:
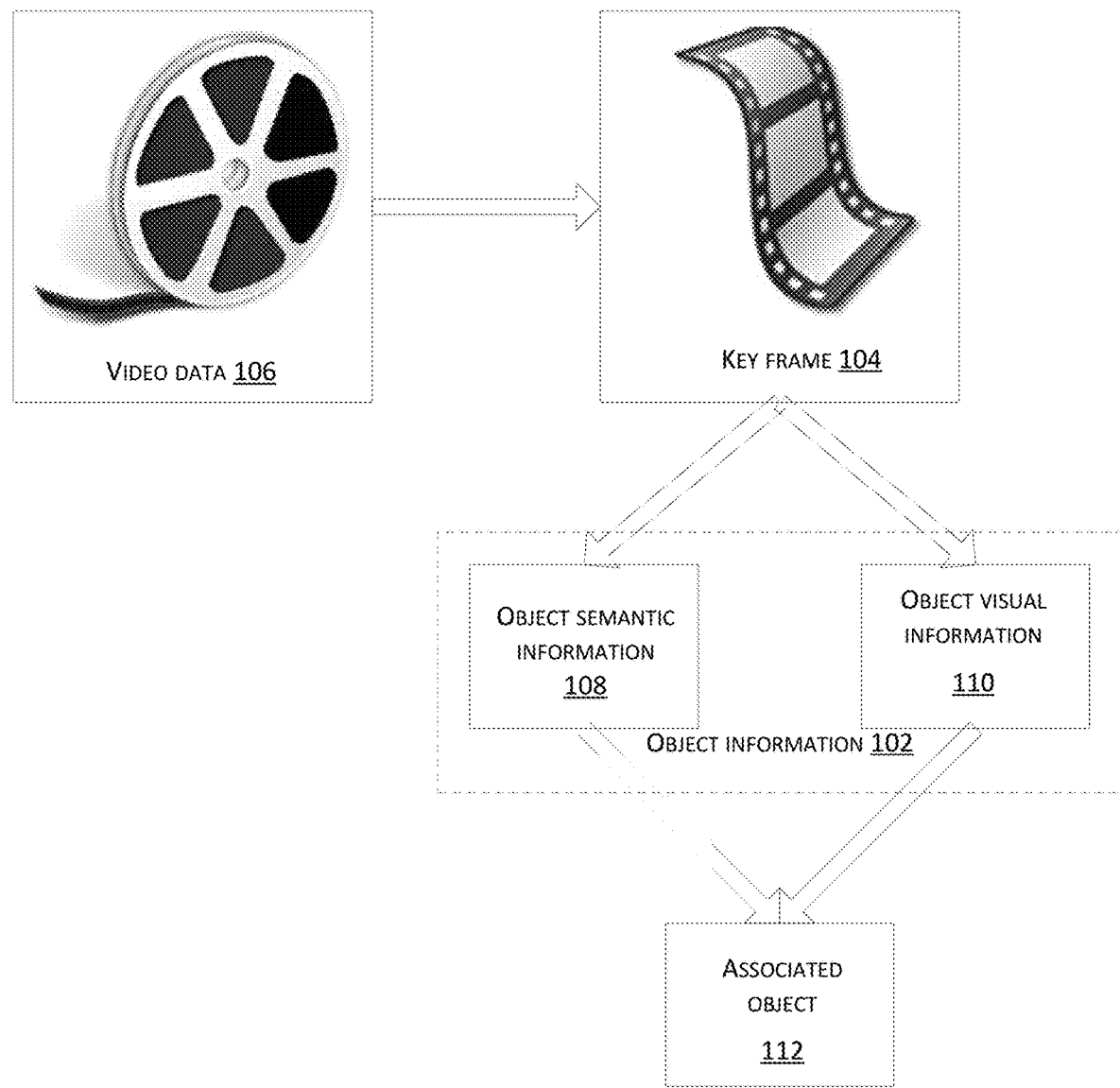
FIG. 1 is a schematic diagram of an example embodiment of a recommended object determination method according to the present disclosure.

FIG. 1 is a schematic diagram of an example embodiment of a recommended object determination method according to the present disclosure. Referring to FIG. 1, at least one key frame corresponding to video data may be determined based on the video data.

In an implementation manner, the step of acquiring at least one key frame corresponding to video data may be implemented in the following manner: comparing display content corresponding to adjacent video frames in the video data; when a change occurs in the content displayed by the two adjacent video frames, using the video frames before the change occurs as candidate key frames; and removing repetitive key frames displaying identical content from the candidate key frames to obtain the key frames corresponding to the video content. The step of removing repetitive key frames displaying identical content from the candidate key frames may specifically be retaining one of the multiple candidate key frames displaying identical content.

An object detection operation may be performed on any of the key frames, e.g., a first key frame.

The object detection operation may generally be implemented by using a learning model. Specifically, a classifier may be established by using an image recognition database. Large Scale Detection through Adaptation (LSDA) training may be performed by using commodity picture samples, and an in-frame object of the key frame may be detected based on a result of the LSDA training. The image recognition database is used for recognizing pictures of various categories of objects. The image recognition database may adopt an existing image recognition database such as ImageNet, or a newly established image recognition database based on actual needs.

Referring to FIG. 1, object information associated with the first key frame may be determined through the object detection operation. For example, object information 102 of an in-frame object of a key frame 104 such as the first key frame may be determined through the object detection operation. The key frame 104 is extracted from video data 106.

The object information 102 includes object semantic information 108 and object visual information 110. The object semantic information 108 may be text description information of the in-frame object, such as the name, model, and place of origin of the in-frame object. The object visual information 110 of the in-frame object may be a picture of the in-frame object, such as a sectional picture of the in-frame object.

Figure 2:
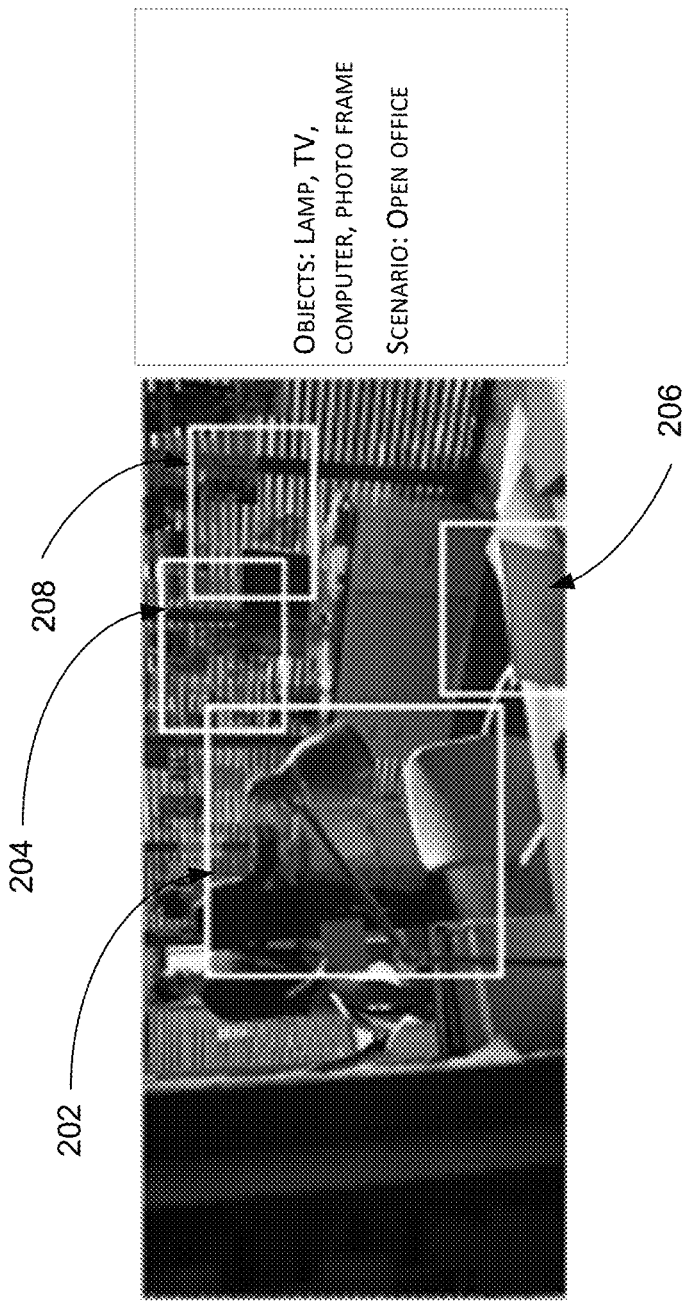
FIG. 2 is an illustration of object detection and scenario classification performed on a key frame according to an example embodiment of the present disclosure.
Figure 3:
FIG. 3 is an illustration of an example object visual information according to the present disclosure.

Referring to FIG. 2, in an exemplary scenario, the object detection operation may be performed on a key frame shown in FIG. 2. The in-frame objects of the key frame are determined to include: a lamp 202, a TV 204, a computer 206, and a photo frame 208. Here, semantic information of the in-frame object "lamp" may be "table lamp", and visual information may be a picture of a table lamp as shown in FIG. 3.

Referring to FIG. 1, a recommended associated object 112 that is associated with the key frame 104 such as the first key frame may be determined based on the object semantic information 108 and the object visual information 110 associated with the first key frame 104. Specifically, candidate objects may be determined based on the object semantic information; visual information of the candidate objects is acquired, and similarity degrees between the visual information of the candidate objects and the object visual information are calculated; and the associated object that is associated with the first key frame is obtained by screening the candidate objects based on the similarity degrees between the visual information of the candidate objects and the object visual information. The visual information of the candidate objects may be pictures of the candidate objects.

The step of calculating similarity degrees between the visual information of the candidate objects and the object visual information may be calculating similarity degrees between the picture of the in-frame object and the pictures of the candidate objects. A similarity degree between two pictures may be calculated by using an existing calculation method. For example, a Euclidean distance, a Histogram matching value, or the like between two pictures may be calculated, which is not limited in the present disclosure. Generally, a larger calculated similarity degree may indicate a higher similarity degree of two pictures.

The candidate objects may be determined according to the object semantic information. Specifically, a search operation can be performed on an e-commerce website with text description information of the objects, and the search results include objects which may be used as candidate objects.

A recommended object associated with the first key frame is obtained by screening the candidate objects based on the similarity degrees between the visual information of the candidate objects and the object visual information. Specifically, first N candidate objects having high visual information similarity degrees may be selected as recommended objects associated with the first key frame. For example, the first N candidate objects having the largest calculated similarity degree values may be used as recommended objects associated with the first key frame. Candidate objects having visual information similarity degrees greater than a first threshold may also be used as recommended objects associated with the first key frame.

In an exemplary scenario, for example, an object detected from the key frame in FIG. 2 is "lamp". Semantic information of the object may be "table lamp", and visual information may be a picture of a table lamp as shown in FIG. 3. In this case, a search operation based on the "table lamp" may be performed on an e-commerce website to obtain candidate objects. Visual information of the candidate objects such as pictures of the candidate objects are acquired. Similarity degrees between the pictures of the candidate objects and the picture of the table lamp shown in FIG. 3 are calculated, and the first 10 candidate objects having the largest similarity degrees may be used as recommended objects associated with the key frame shown in FIG. 2. Alternatively, candidate objects having similarity degrees greater than 0.5 may be used as recommended objects associated with the key frame shown in FIG. 2.

The above example embodiment considers both semantic information and visual information of a detected in-frame object when searching for recommended objects by using the object. It is thus guaranteed that an object provided for the user is precisely correlated to video content semantically and visually.

Figure 4:
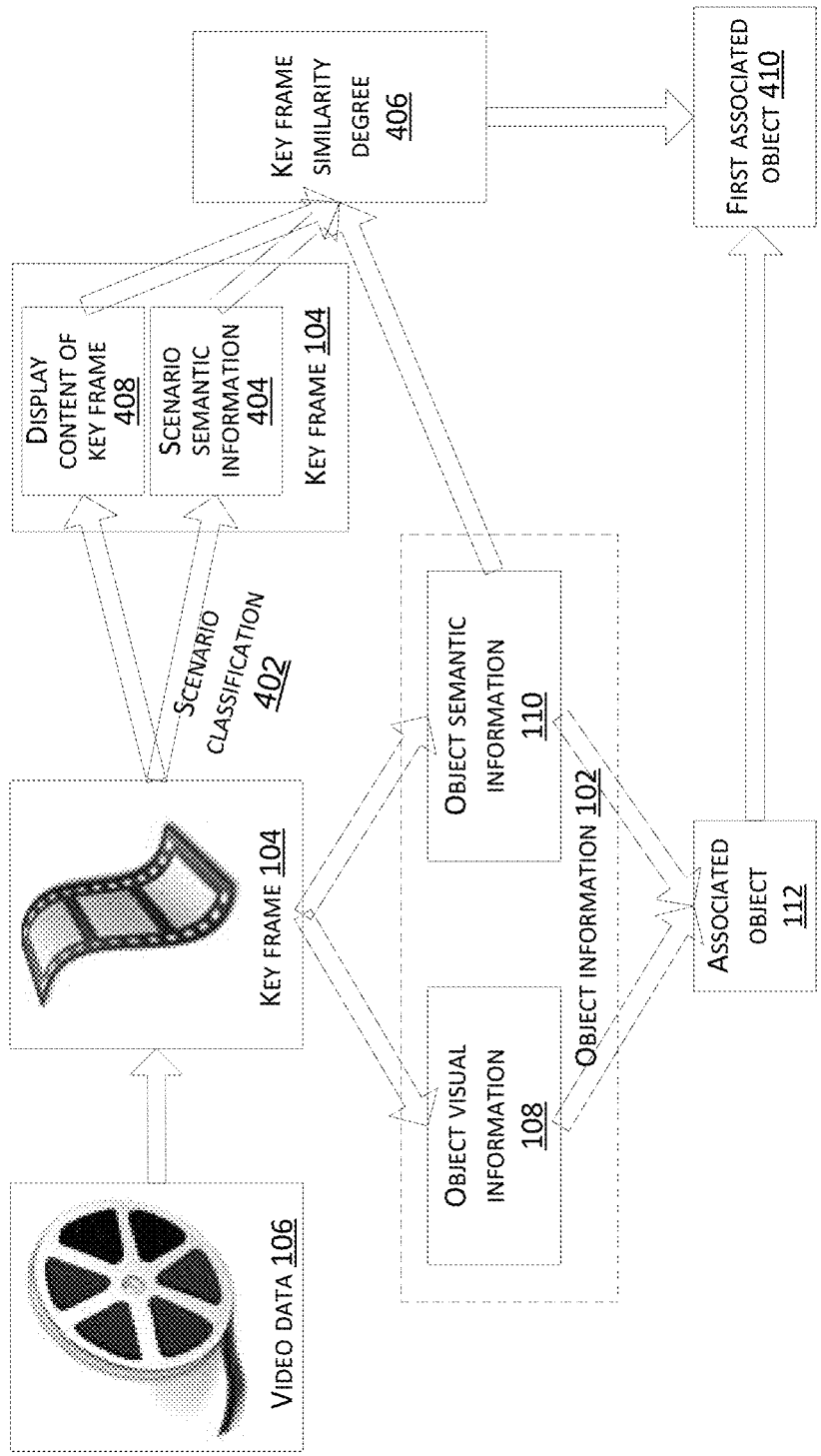
FIG. 4 is a schematic diagram of another example embodiment of a recommended object determination method according to the present disclosure.

Further, FIG. 4 is a schematic diagram of another example embodiment of a recommended object determination method according to the present disclosure. Referring to FIG. 4, in another implementation manner, a scenario classification 402 operation may further be performed on each of the key frames such as the key frame 104 to determine scenario semantic information 404 of each of the key frames. Semantic information of the key frame 104 is determined based on the scenario semantic information 404 and the object semantic information 112 of the key frame 104. A key frame similarity degree 406 between any two of the key frames is calculated based on display content of the key frame 408 and the semantic information of the key frame of the two key frames. One or more key frames associated with the recommended associated object are determined based on the similarity degrees between the key frames and the recommended object associated with the first key frame. The key frame associated with the recommended first associated object 410 may include the first key frame.

The scenario classification operation performed on the key frame may generally be implemented by using a deep learning model, such as GoogleNet. Scenario information of the key frame may be determined by means of the scenario classification operation. The scenario information of the key frame may include: scenario semantic information. The scenario semantic information may include a text description of the scenario. For example, the scenario semantic information may be: kitchen, bar, or the like. For example, scenario information of the key frame shown in FIG. 2 may be determined as "open office" by means of the scenario classification operation.

Key frame semantic information of each of the key frames may be calculated after scenario semantic information and object semantic information of each key frame are obtained. The key frame semantic information of the key frame may be used to represent a scenario corresponding to the key frame and an object corresponding to the key frame.

The key frame semantic information of the key frame may be expressed by using a key frame semantic matrix. The step of calculating the key frame semantic information of the key frame based on the scenario semantic information and the object semantic information of the key frame may specifically include: calculating term frequency-inverse document frequency (ti-idf) vectors of the scenario semantic information and the object semantic information, a matrix formed by the vectors obtained by calculation being the key frame semantic information of the key frame.

A similarity degree between any two of the key frames may be calculated based on the key frame semantic information of the key frames and the display content of the key frames. Specifically, a visual similarity degree between two key frames may be calculated based on display content of the two key frames; a semantic similarity degree between the two key frames may be calculated based on key frame semantic information of the two key frames; and a key frame similarity degree between the two key frames may be calculated based on the visual similarity degree and the semantic similarity degree.

For example, the similarity degree between two key frames may specifically be calculated by using the following formula:

$$S_{i,j} = e^{-(\alpha V_{i,j} + (1-\alpha) T_{i,j})} \tag{1}$$

In the above formula (1), $S_{i,j}$ represents a key frame similarity degree between a key frame i and a key frame j that needs to be calculated; $V_{i,j}$ represents a visual similarity degree between the key frame i and the key frame j; $T_{i,j}$ represents a semantic similarity degree between the key frame i and the key frame j; and α may be an adjustment coefficient ranging from 0 to 1. The value of α may be determined based on an actual experimental result. Generally, an example value of a may be 0.5-0.6.

The step of calculating a visual similarity degree between two key frames comprises calculating a similarity degree between display content of the two key frames. For example, a similarity degree of display pictures corresponding to the two key frames may be calculated.

The step of calculating a semantic similarity degree between two key frames comprises calculating a similarity degree between semantic matrices of the two key frames. The calculation may be implemented by using any semantic similarity degree calculation method such as a text depth representation model, which is not limited in the present disclosure.

In the above step, multiple key frames having high similarity degrees may be obtained by calculating similarity degrees between the key frames. When an object is used as an associated object of a key frame, the associated object may be associated with the multiple key frames having high similarity degrees. As such, similar key frames have a same associated object, and it is guaranteed that more comprehensive associated objects may be provided for the user by each key frame, thus improving user experience.

Figure 5:
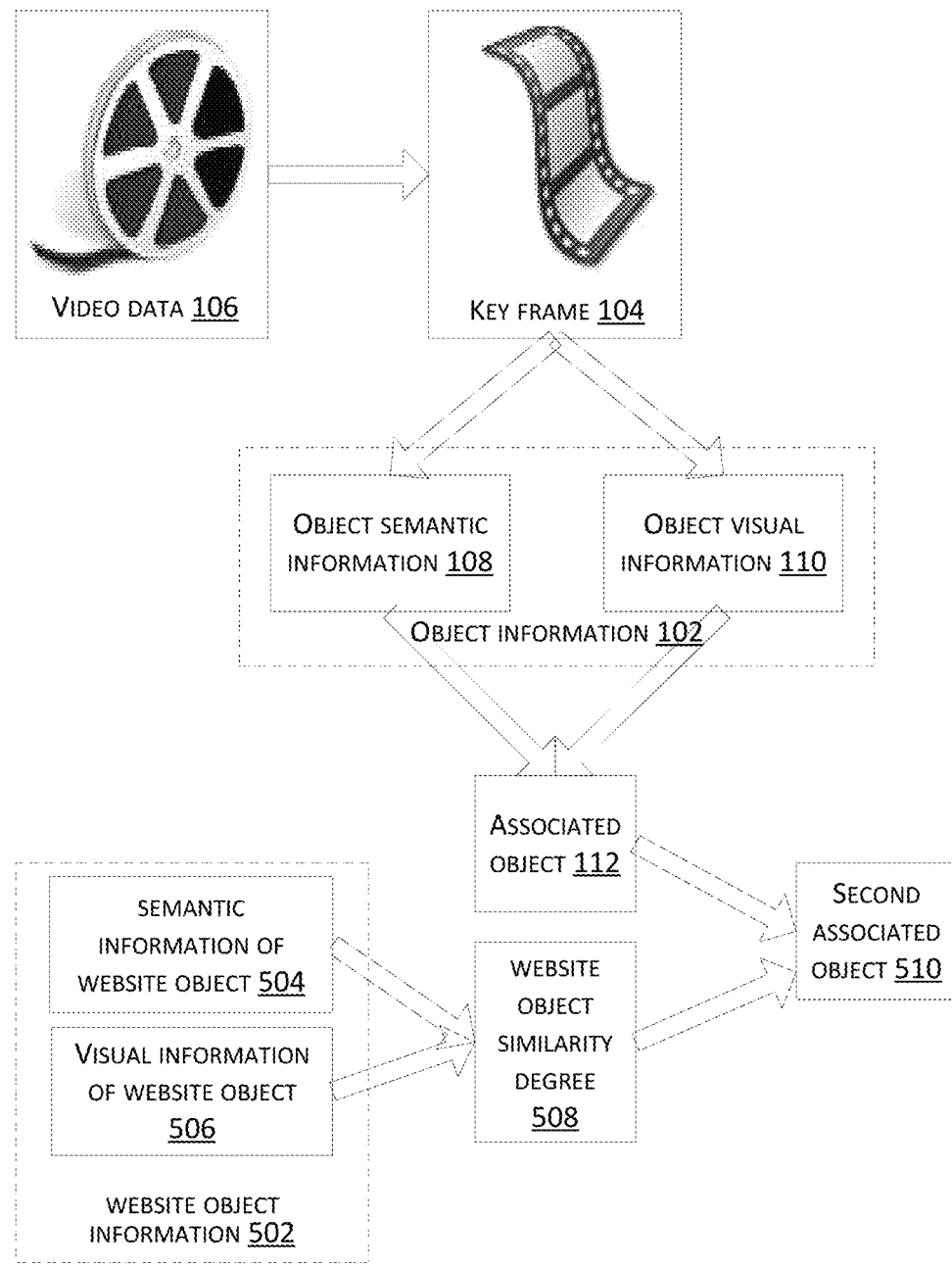
FIG. 5 is a schematic diagram of another example embodiment of a recommended object determination method according to the present disclosure.

Further, FIG. 5 is a schematic diagram of another example embodiment of a recommended object determination method according to the present disclosure. Referring to FIG. 5, in another implementation manner, the method may further include: acquiring website object information 502, the website object information including semantic information of a website object 504 and visual information of the website object 506; calculating website object similarity degrees 508 between the website objects based on the website object information 502; and determining a recommend second associated object 510 that is associated with the first key frame in the key frames based on the website object similarity degrees 508 of the website objects and the associated object 112 associated with the first key frame.

The website object may be an object that can be obtained from an e-commerce website, for example, a commodity sold on the e-commerce website. In this case, the semantic information of the website object may be acquired based on text information of the commodity, for example, acquired based on information such as a commodity title and a commodity description. Specifically, the text information of the website object on the e-commerce website may be word-segmented. The step of word-segmenting the text information may be implemented by using a word-segmenting method based on lexicon matching, a word-segmenting method based on word frequency statistics, a word-segmenting method based on knowledge understanding, or the like. Word-segmented terms may be filtered based on parts of speech. For example, word-segmented terms whose parts of speech are nouns may be retained, and word-segmented terms whose parts of speech are adverbs or verbs may be removed. The filtering result may be quantized into tf-idf vectors, a matrix formed by the tf-idf vectors being the semantic information of the website object. The visual information of the website object may be a picture of the commodity, such as a main picture of the commodity.

The step of calculating website object similarity degrees between the website objects based on the website object information may be implemented by using the following formula (2):

$$Q_{i,j} = e^{-(\beta A_{i,j} + (1-\alpha) B_{i,j})} \quad (2)$$

In the formula (2), $Q_{i,j}$ represents a website object website object similarity degree between a website object i and a website object j that needs to be calculated; $A_{i,j}$ represents a visual similarity degree between the website object i and the website object j; $B_{i,j}$ represents a semantic similarity degree between the website object i and the website object j; β may be an adjustment coefficient ranging from 0 to 1. The value of β may be determined based on an actual experimental result. Generally, an example value of β may be 0.5-0.6.

In the above step, multiple website objects having high similarity degrees may be obtained by calculating similarity degrees between the website objects. When a website object is used as an associated object of a key frame, the multiple website objects having high similarity degrees with the website object may be used as objects associated with the key frame. As such, it is guaranteed that more abundant associated objects may be provided for the user by each key frame, thus improving user experience.

Figure 6:
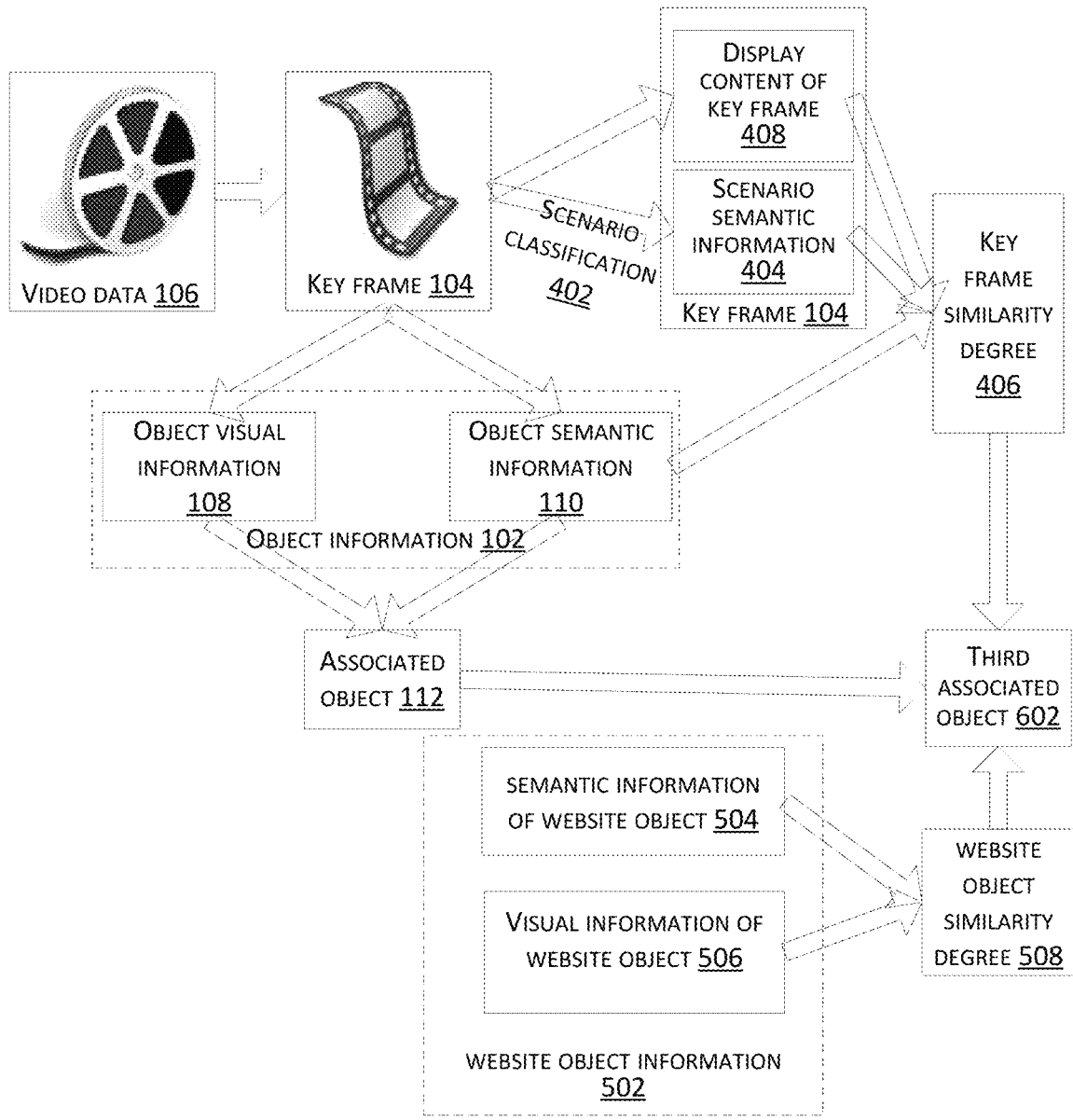
FIG. 6 is a schematic diagram of another example embodiment of a recommended object determination method according to the present disclosure.

Further, FIG. 6 is a schematic diagram of another example embodiment of a recommended object determination method according to the present disclosure. Referring to FIG. 6, in another implementation manner, a key frame similarity degree 406 between any two of the key frames and a website object similarity degree 508 of website objects may be calculated, and a recommended third associated object 602 that is associated with any of the key frames may be determined based on the recommended associated object 112 that associated with the key frames, the website object similarity degree 508 of the website objects, and the key frame similarity degree 406 of any two of the key frames.

In the above step, after a key frame is associated with a recommended object, objects having high similarity degrees with the recommended object and other key frames having high similarity degrees with the key frame may further be considered. Multiple website objects having high similarity degrees may be associated with one key frame, or a same object may be associated with multiple key frames having high similarity degrees, thereby guaranteeing that each key frame may provide more abundant and comprehensive associated objects for the user and improving user experience.

FIG. 7 is a flowchart of an example embodiment of a recommended object determination method according to the present disclosure. The present disclosure provides operation steps of the method as described in the example embodiment or flowchart. However, more or fewer operation steps may be included without creative efforts. A step order listed in the example embodiment is merely one of multiple orders of executing the steps, and does not represent a unique execution order. In practice, when a system or client terminal executes a product, the steps may be executed based on a method order shown in the example embodiment or the accompany drawing or may be executed concurrently (for example, in a parallel processor or a multi-thread processing environment). As shown in FIG. 7, the recommended object determination method may include the following steps.

S702: At least one key frame corresponding to video data is acquired, the key frame being a video frame that validly identifies an in-frame object.

The key frame may further validly identify an in-frame scenario.

The step of acquiring a key frame corresponding to video data may specifically include: comparing display content corresponding to adjacent video frames in the video data; when a change occurs in the content displayed by the two adjacent video frames, using the video frame before the change occurs as a candidate key frame; and removing repetitive key frames displaying identical content from the candidate key frames to obtain the key frame corresponding to the video content.

S704: An object detection operation is performed on a first key frame among the key frames to determine object information associated with the first key frame, the object information including object semantic information and object visual information.

The object semantic information may be text description information of the object. The object visual information may be a picture of the object.

S706: Candidate objects are determined based on the object semantic information, and a recommended object associated with the first key frame is obtained by screening the candidate objects based on the object visual information.

The step of determining candidate objects based on the object semantic information may specifically include: searching an e-commerce website based on text description information of the object, and using found objects as candidate objects.

The step of obtaining a recommended object associated with the first key frame by screening the candidate objects based on the object visual information may specifically include: acquiring visual information of the candidate objects, and calculating similarity degrees between the visual information of the candidate objects and the object visual information; and obtaining a recommended object associated with the first key frame by screening the candidate objects based on the similarity degrees between the visual information of the candidate objects and the object visual information.

The recommended object determination method provided in the above example embodiment considers both semantic information and visual information of a detected in-frame object when searching for recommended objects by using the object. It is thus guaranteed that an object provided for the user is precisely correlated to video content semantically and visually.

In another implementation manner, the method may further include: performing a scenario classification operation on each of the key frames to determine scenario semantic information of each of the key frames; determining key frame semantic information of the key frames based on the scenario semantic information and the object semantic information of the key frames; calculating a similarity degree between any two of the key frames based on display content of the key frames and the key frame semantic information of the key frames; and determining one or more key frames associated with the recommended object based on the similarity degrees between the key frames and the recommended object associated with the first key frame.

The step of determining the key frame semantic information of the key frame based on the scenario semantic information and the object semantic information of the key frame may include: calculating tf-idf vectors of the scenario semantic information and the object semantic information, a matrix formed by the vectors obtained by calculation being the key frame semantic information of the key frame.

The step of calculating a similarity degree between any two key frames based on the key frame semantic information of the key frames and display content of the key frames may include: calculating a visual similarity degree between the two key frames based on display content of the two key frames; calculating a semantic similarity degree between the two key frames based on key frame semantic information of the two key frames; and calculating a key frame similarity degree between the two key frames based on the visual similarity degree and the semantic similarity degree.

In the above example embodiment, multiple key frames having high similarity degrees may be obtained by calculating similarity degrees between the key frames. When an object is used as an associated object of a key frame, the associated object may be associated with the multiple key frames having high similarity degrees. As such, similar key frames have a same associated object, and it is guaranteed that more comprehensive associated objects may be provided for the user by each key frame, thus improving user experience.

In another implementation manner, the method may further include: acquiring website object information, the website object information including: semantic information of website objects and visual information of the website objects; calculating similarity degrees between the website objects based on the website object information; and determining a second recommended object associated with the first key frame in the key frames based on the similarity degrees of the website objects and the recommended object associated with the first key frame.

The website object may be a commodity on an e-commerce website. The semantic information of the website object may be acquired based on text information of the commodity. The visual information of the website object may be a picture of the commodity. The step of acquiring the semantic information of the website object based on text information of the commodity may specifically include: word-segmenting the text information of the website object on the e-commerce website; filtering word-segmented terms based on parts of speech; and quantizing the filtering result into tf-idf vectors, a matrix formed by the tf-idf vectors being the semantic information of the website object.

In the above example embodiment, multiple website objects having high similarity degrees may be obtained by calculating similarity degrees between the website objects. When a website object is used as an associated object of a key frame, the multiple website objects having high similarity degrees with the website object may be used as objects associated with the key frame. As such, it is guaranteed that more abundant associated objects may be provided for the user by each key frame, thus improving user experience.

Figure 8:
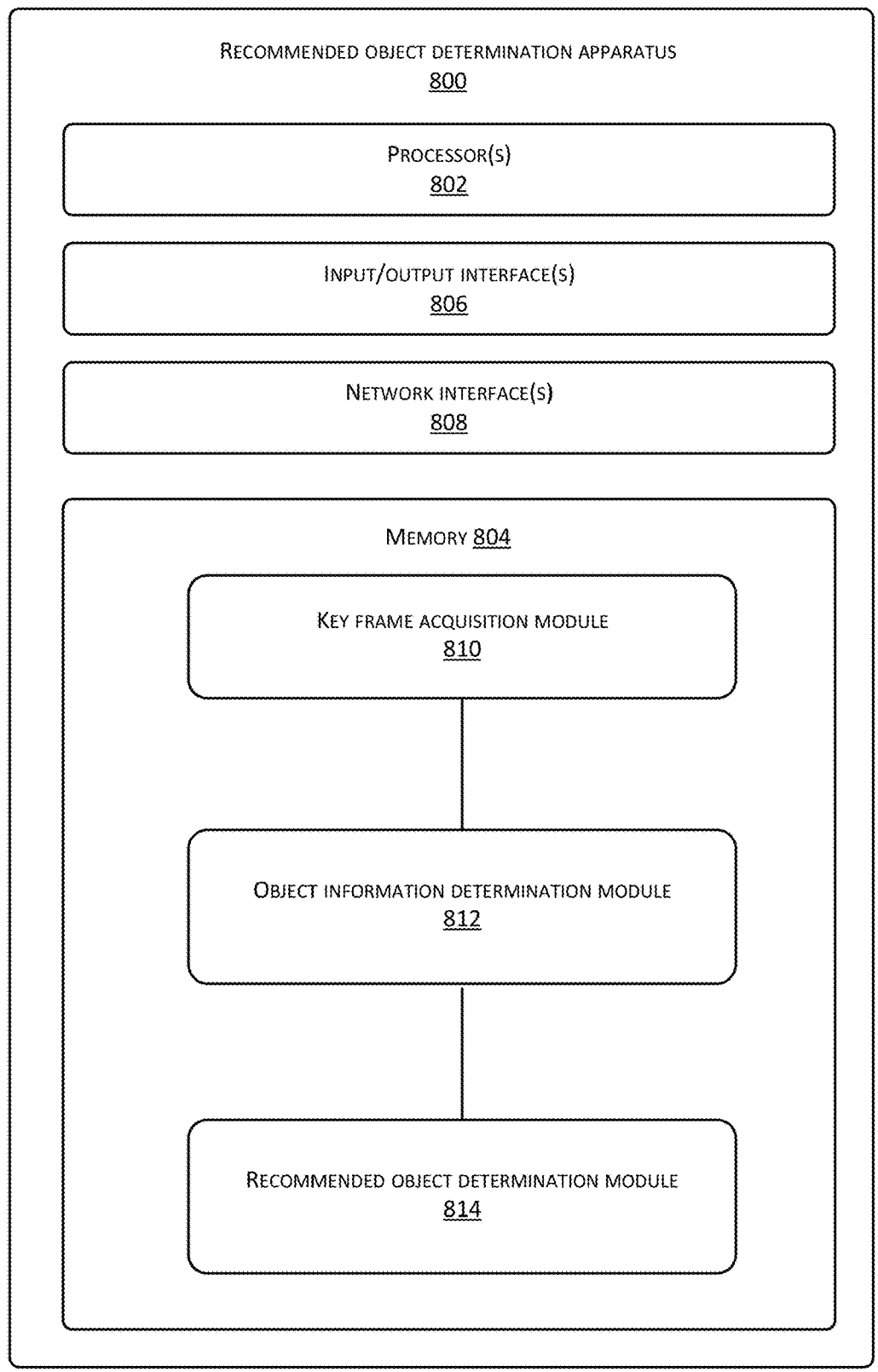
FIG. 8 is a block diagram of an example recommended object determination apparatus according to the present disclosure.

The present disclosure further provides an example embodiment of a recommended object determination apparatus. FIG. 8 is a schematic diagram of an example embodiment of a recommended object determination apparatus according to the present disclosure. As shown in FIG. 8, the recommended object determination apparatus 800 may include one or more processor(s) 802 or data processing unit(s) and memory 804. The recommended object determination apparatus 800 may further include one or more input/output interface(s) 806 and one or more network interface(s) 808. The memory 804 is an example of computer readable media.

The memory 804 may store therein a plurality of modules or units including a key frame acquisition module 810, an object information determination module 812, and a recommended object determination module 814.

The key frame acquisition module 810 may be configured to acquire at least one key frame corresponding to video data. The key frame is a video frame that validly identifies an in-frame object.

The object information determination module 812 may be configured to perform an object detection operation on a first key frame among the key frames to determine object information associated with the first key frame. The object information includes: object semantic information and object visual information. The first key frame may be any key frame among the key frames.

The recommended object determination module 814 may be configured to determine candidate objects based on the object semantic information, and obtain a recommended object associated with the first key frame by screening the candidate objects based on the object visual information.

Figure 9:
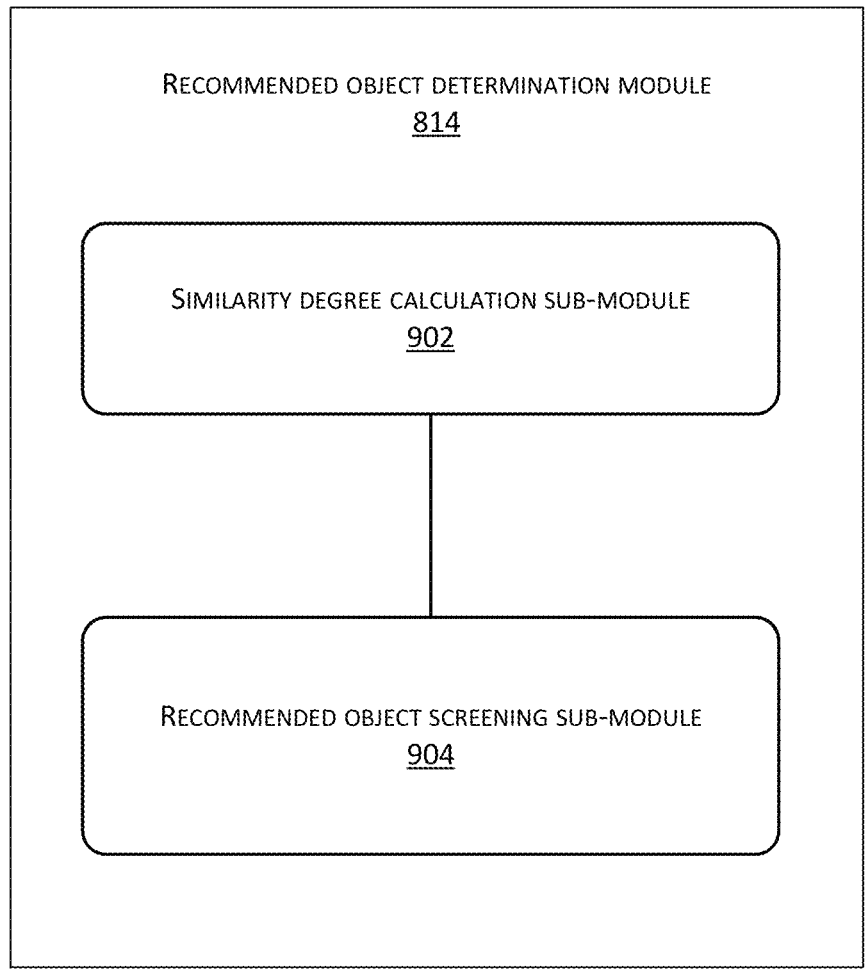
FIG. 9 is a schematic composition diagram of an example recommended object determination module according to the present disclosure.

FIG. 9 is a schematic diagram of the recommended object determination module 814 according to an apparatus example embodiment of the present disclosure. As shown in FIG. 9, the recommended object determination module 814 may include a similarity degree calculation sub-module 902 and a recommended object screening sub-module 904.

The similarity degree calculation sub-module 902 may be configured to acquire visual information of the candidate objects, and calculate similarity degrees between the visual information of the candidate objects and the object visual information.

The recommended object screening sub-module 904 may be configured to obtain a recommended object associated with the first key frame by screening the candidate objects based on the similarity degrees between the visual information of the candidate objects and the object visual information.

In another implementation manner, the recommended object determination apparatus 800 may further include a key frame association module (not shown in FIG. 8) stored on memory 804. The key frame association module may be configured to perform a scenario classification operation on each of the key frames to determine scenario semantic information of each of the key frames; determine key frame semantic information of the key frames based on the scenario semantic information and the object semantic information of the key frames; calculate a similarity degree between any two of the key frames based on the display content of the key frames and the key frame semantic information of the key frames; and determine one or more key frames associated with the recommended object based on the similarity degrees between the key frames and the recommended object associated with the first key frame.

In another implementation manner, the recommended object determination apparatus 800 may further include an object association module (not shown in FIG. 8) stored on memory 804. The object association module may be configured to acquire website object information, the website object information including: semantic information of website objects and visual information of the website objects; calculate similarity degrees between the website objects based on the website object information; and determine a second recommended object associated with the first key frame in the key frames based on the similarity degrees of the website objects and the recommended object associated with the first key frame.

An example embodiment of the present disclosure further provides computer readable media. In this example embodiment, the computer readable media may store computer-readable instructions for implementing the following steps when being executed by a processor:

S702: At least one key frame corresponding to video data is acquired, the key frame being a video frame that validly identifies an in-frame object.

S704: An object detection operation is performed on a first key frame among the key frames to determine object information associated with the first key frame, the object information including: object semantic information and object visual information.

S706: Candidate objects are determined based on the object semantic information, and a recommended object associated with the first key frame is obtained by screening the candidate objects based on the object visual information.

In another implementation manner, the computer-readable instructions stored in the computer readable media may further implement the following steps when being executed by the processor:

performing a scenario classification operation on each of the key frames to determine scenario semantic information of each of the key frames;

determining key frame semantic information of the key frames based on the scenario semantic information and the object semantic information of the key frames;

calculating a similarity degree between any two of the key frames based on the display content of the key frames and the key frame semantic information of the key frames; and determining one or more key frames associated with the recommended object based on the similarity degrees between the key frames and the recommended object associated with the first key frame.

In another implementation manner, the computer-readable instructions stored in the computer readable media may further implement the following steps when being executed by the processor:

acquiring website object information, the website object information including: semantic information of website objects and visual information of the website objects;

calculating similarity degrees between the website objects based on the website object information; and determining a second recommended object associated with the first key frame in the key frames based on the similarity degrees of the website objects and the recommended object associated with the first key frame.

The example embodiment of the recommended object determination apparatus and the example embodiment of the computer readable media are corresponding to the recommended object determination method provided in the example embodiment of the present disclosure. The apparatus example embodiment or the execution of the computer-readable instructions stored in the computer readable media may implement the method example embodiment of the present disclosure and achieve the technical effects of the method example embodiment.

In the 1990s, an improvement on a technology may be obviously distinguished as an improvement on hardware (for example, an improvement on a circuit structure such as a diode, a transistor, and a switch) or an improvement on software (an improvement on a method procedure). However, with the development of technologies, improvements of many method procedures at present may be considered as direct improvements on hardware circuit structures. Almost all designers program the improved method procedures into hardware circuits to obtain corresponding hardware circuit structures. Therefore, it cannot be assumed that the improvement of a method procedure cannot be implemented by using a hardware entity module. For example, a Programmable Logic Device (PLD) (for example, a Field Programmable Gate Array (FPGA)) is such an integrated circuit, and its logic functions are determined by a user programming devices. Designers program by themselves to "integrate" a digital system into a piece of PLD, without inviting a chip manufacturer to design and manufacture a dedicated integrated circuit chip 2. Moreover, at present, the programming is mostly implemented by using logic compiler software, instead of manually manufacturing an integrated circuit chip. The software is similar to a software complier used for developing and writing a program, and original code before compiling also needs to be written in a specific programming language, which is referred to as a Hardware Description Language (HDL). There are many types of HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL), among which a Very-High-Speed Integrated Circuit Hardware Description Language (VHDL) and Verilog2 are most commonly used now. Those skilled in the art also should know that a hardware circuit for implementing the logic method procedure may be easily obtained only by slightly logically programming the method procedure using the above several hardware description languages and programming it into an integrated circuit.

A controller may be implemented in any suitable manner. For example, the controller may be in the form of, for example, a microprocessor or a processor and a computer readable medium storing computer readable program codes (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller may also be implemented as a part of control logic of a memory.

Those skilled in the art should also know that, in addition to implementing the controller by using pure computer readable program codes, the method steps may be logically programmed to enable the controller to implement the same function in a form of a logic gate, a switch, an ASIC, a programmable logic controller, an embedded microcontroller, and the like. Therefore, this type of controller may be considered as a hardware component, and apparatuses included therein and used for implementing various functions may also be considered as structures inside the hardware component, or even the apparatuses used for implementing various functions may be considered as both software modules for implementing the method and structures inside the hardware component.

The system, apparatus, module or unit illustrated in the above example embodiments may specifically be implemented by using a computer chip or an entity, or a product having a certain function.

For ease of description, when the apparatus is described, it is divided into various units in terms of functions for respective descriptions. Certainly, when the present disclosure is implemented, functions of the units may be implemented in the same or multiple software and/or hardware.

Based on the foregoing descriptions of the implementation manners, those skilled in the art may clearly understand that the present disclosure may be implemented by software plus a necessary universal hardware website. Based on such understanding, the technical solutions of the present disclosure essentially or the part contributing to the conventional techniques may be implemented in a form of a software product. In a typical configuration, a computer device includes one or more processors (CPU), an input/output interface, a network interface, and a memory. The computer software product may include several instructions for instructing a computer device (which may be a personal computer, a server, a network device, or the like) to perform the methods described in the example embodiments or some parts of the present disclosure. The computer software product may be stored in a memory, and the memory may include a volatile memory, a random access memory (RAM) and/or a non-volatile memory or the like in a computer readable medium, for example, a read only memory (ROM) or a flash RAM. The memory is an example of the computer readable medium. The computer readable medium includes non-volatile and volatile media as well as movable and non-movable media, and may implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition of this text, the computer readable medium does not include transitory media, such as a modulated data signal and a carrier.

The example embodiments in the specification are described progressively, identical or similar parts of the example embodiments may be obtained with reference to each other, and each example embodiment emphasizes a part different from other example embodiments. Especially, the system example embodiment is basically similar to the method example embodiment, so it is described briefly. For related parts, refer to the descriptions of the parts in the method example embodiment.

The present disclosure may be applicable to various universal or dedicated computer system environments or configurations, such as, a personal computer, a server computer, a handheld device or a portable device, a tablet device, a multi-processor system, a microprocessor-based system, a set top box, a programmable consumer electronic device, a network PC, a minicomputer, a mainframe computer, and a distributed computing environment including any of the above systems or devices.

The present disclosure may be described in a common context of computer executable instructions executed by a computer, for example, a program module. Generally, the program module includes a routine, a program, an object, an assembly, a data structure, and the like used for executing a specific task or implementing a specific abstract data type. The present disclosure may also be implemented in a distributed computing environment, and in the distributed computer environment, a task is executed by using remote processing devices connected via a communications network. In the distributed computer environment, the program module may be located in a local and remote computer readable media including a storage device.

Although the present disclosure is described through example embodiments, those of ordinary skill in the art should know that the present disclosure has many variations and changes without departing from the spirit of the present disclosure, and it is expected that the appended claims cover the variations and changes without departing from the spirit of the present disclosure.

The present disclosure may further be understood with clauses as follows.

Clause 1. A recommended object determination method comprising:

acquiring at least one key frame corresponding to video data, the key frame being a video frame that validly identifies an in-frame object;

performing an object detection operation on a first key frame among the key frames to determine object information associated with the first key frame, the object information comprising: object semantic information and object visual information; and determining candidate objects based on the object semantic information, and obtaining a recommended object associated with the first key frame by screening the candidate objects based on the object visual information.

Clause 2. The method of clause 1, wherein the step of acquiring a key frame corresponding to video data specifically comprises:

comparing video content displayed by adjacent video frames in the video data, and when a change occurs in the video content displayed by the video frames, using video frames corresponding to the video content before the change as candidate key frames; and removing repetitive key frames displaying identical content from the candidate key frames, to obtain key frames corresponding to the video content.

Clause 3. The method of clause 1, wherein the step of obtaining a recommended object associated with the first key frame by screening the candidate objects based on the object visual information comprises:

acquiring visual information of the candidate objects, and calculating similarity degrees between the visual information of the candidate objects and the object visual information; and obtaining a recommended object associated with the first key frame by screening the candidate objects based on the similarity degrees between the visual information of the candidate objects and the object visual information.

Clause 4. The method of clause 3, wherein the object semantic information comprises: text description information of the objects.

Clause 5. The method of clause 4, wherein the step of determining candidate objects based on the object semantic information comprises: searching an e-commerce platform based on the text description information of the objects, and using found objects as candidate objects.

Clause 6. The method of clause 3, wherein the object visual information comprises: pictures of the objects.

Clause 7. The method of clause 1, further comprising:

performing a scenario classification operation on each of the key frames to determine scenario semantic information of each of the key frames;

determining key frame semantic information of the key frames based on the scenario semantic information and the object semantic information of the key frames;

calculating a similarity degree between any two of the key frames based on the display content of the key frames and the key frame semantic information of the key frames; and determining one or more key frames associated with the recommended object based on the similarity degrees between the key frames and the recommended object associated with the first key frame.

Clause 8. The method of clause 7, wherein the step of determining key frame semantic information of the key frames based on the scenario semantic information and the object semantic information of the key frames comprises:

calculating term frequency-inverse document frequency (ti-idf) vectors of the scenario semantic information and the object semantic information, a matrix formed by the vectors obtained by calculation being the key frame semantic information of the key frames.

Clause 9. The method of clause 7, wherein the step of calculating a similarity degree between any two of the key frames based on the key frame semantic information of the key frames and the display content of the key frames comprises:

calculating a visual similarity degree between the two key frames based on the display content of the two key frames;

calculating a semantic similarity degree between the two key frames based on the key frame semantic information of the two key frames; and calculating a key frame similarity degree between the two key frames based on the visual similarity degree and the semantic similarity degree.

Clause 10. The method of clause 1 or 7, further comprising:

acquiring platform object information, the platform object information comprising: semantic information of platform objects and visual information of the platform objects;

calculating similarity degrees between the platform objects based on the platform object information; and determining a second recommended object associated with the first key frame in the key frames based on the similarity degrees of the platform objects and the recommended object associated with the first key frame.

Clause 11. The method of clause 10, wherein the platform object is a commodity on an e-commerce platform; the semantic information of the platform object is acquired based on text information of the commodity; and the visual information of the platform object is a picture of the commodity.

Clause 12. The method of clause 11, wherein the step of acquiring the semantic information of the platform object based on text information of the commodity comprises:

word-segmenting the text information of the platform object on the e-commerce platform;

filtering word-segmented terms based on parts of speech; and quantizing the filtering result into tf-idf vectors, a matrix formed by the tf-idf vectors being the semantic information of the platform object.

Clause 13. The method of claim 1, further comprising:

calculating key frame similarity degrees between respective two key frames of the one or more key frames;

calculating platform object similarity degrees between platform objects; and determining a third recommended object associated with the first key frame based on the key frame similarity degrees, the platform object similarity degrees, and the recommended object.

Clause 14. A recommended object determination apparatus, comprising:

a key frame acquisition module configured to acquire at least one key frame corresponding to video data, the key frame being a video frame that validly identifies an in-frame object;

an object information determination module configured to perform an object detection operation on a first key frame among the key frames to determine object information associated with the first key frame, the object information comprising: object semantic information and object visual information, and the first key frame being any of the key frames; and a recommended object determination module configured to determine candidate objects based on the object semantic information, and obtain a recommended object associated with the first key frame by screening the candidate objects based on the object visual information.

Clause 15. The apparatus of clause 14, wherein the recommended object determination module comprises: a similarity degree calculation sub-module and a recommended object screening sub-module;

the similarity degree calculation sub-module is configured to acquire visual information of the candidate objects, and calculate similarity degrees between the visual information of the candidate objects and the object visual information; and the recommended object screening sub-module is configured to obtain a recommended object associated with the first key frame by screening the candidate objects based on the similarity degrees between the visual information of the candidate objects and the object visual information.

Clause 16. The apparatus of claim 14, further comprising: a key frame association module configured to perform a scenario classification operation on each of the key frames to determine scenario semantic information of each of the key frames; determine key frame semantic information of the key frames based on the scenario semantic information and the object semantic information of the key frames; calculate a similarity degree between any two of the key frames based on the display content of the key frames and the key frame semantic information of the key frames; and determine one or more key frames associated with the recommended object based on the similarity degrees between the key frames and the recommended object associated with the first key frame.

Clause 17. The apparatus of clause 14 or 16, further comprising: an object association module configured to acquire platform object information, the platform object information comprising: semantic information of platform objects and visual information of the platform objects; calculate similarity degrees between the platform objects based on the platform object information; and determine a second recommended object associated with the first key frame in the key frames based on the similarity degrees of the platform objects and the recommended object associated with the first key frame.

Clause 18. Computer readable media, storing computer-readable instructions for implementing the following steps when being executed by a processor:

acquiring at least one key frame corresponding to video data, the key frame being a video frame that validly identifies an in-frame object;

performing an object detection operation on a first key frame among the key frames to determine object information associated with the first key frame, the object information comprising: object semantic information and object visual information; and determining candidate objects based on the object semantic information, and obtaining a recommended object determined to be associated with the first key frame by screening the candidate objects based on the object visual information.

Clause 19. The computer readable media of clause 18, wherein the computer-readable instructions stored in the computer readable media further implement the following steps when being executed by the processor:

performing a scenario classification operation on each of the key frames to determine scenario semantic information of each of the key frames;

determining key frame semantic information of the key frames based on the scenario semantic information and the object semantic information of the key frames;

calculating a similarity degree between any two of the key frames based on the display content of the key frames and the key frame semantic information of the key frames; and determining one or more key frames associated with the recommended object based on the similarity degrees between the key frames and the recommended object associated with the first key frame.

Clause 20. The computer readable media of clause 18 or 19, wherein the computer-readable instructions stored in the computer readable media further implement the following steps when being executed by the processor:

acquiring platform object information, the platform object information comprising: semantic information of platform objects and visual information of the platform objects;

calculating similarity degrees between the platform objects based on the platform object information; and determining a second recommended object associated with the first key frame in the key frames based on the similarity degrees of the platform objects and the recommended object associated with the first key frame.

Clause 21. An apparatus comprising:
one or more processors; and
one or more memories storing thereon computer-readable instructions that, when executed by the one or more processors, cause the one or more processors to perform second acts comprising:
acquiring one or more key frames corresponding to video data, the key frame being a video frame in which an in-frame object is identified;
performing an object detection operation on a first key frame of the one or more key frames to determine object information associated with the first key frame, the object information including object semantic information and object visual information;
determining one or more candidate objects based on the object semantic information;
filtering a recommended object associated with the first key frame from the one or more candidate objects based on the object visual information;
acquiring platform object information, the platform object information including semantic information of a platform object and visual information of the platform object;
calculating similarity degrees between platform objects based on the platform object information;
calculating key frame similarity degrees between respective two key frames of the one or more key frames; and
determining a third recommended object associated with first key frame based on the key frame similarity degrees, the platform object similarity degrees, and the recommended object.

Clause 22. The apparatus of claim 21, wherein the platform object includes a commodity on an e-commerce platform.

Clause 23. One or more memories storing thereon computer-readable instructions that, when executed by one or more processors, cause the one or more processors to perform second acts comprising:
acquiring one or more key frames corresponding to video data, the key frame being a video frame in which an in-frame object is identified;
performing an object detection operation on a first key frame of the one or more key frames to determine object information associated with the first key frame, the object information including object semantic information and object visual information;
determining one or more candidate objects based on the object semantic information;
filtering a recommended object associated with the first key frame from the one or more candidate objects based on the object visual information;
acquiring platform object information, the platform object information including semantic information of a platform object and visual information of the platform object;
calculating similarity degrees between platform objects based on the platform object information;
calculating key frame similarity degrees between respective two key frames of the one or more key frames; and
determining a third recommended object associated with the first key frame based on the key frame similarity degrees, the platform object similarity degrees, and the recommended object.

What is claimed is:
1. A method comprising:
acquiring one or more key frames corresponding to video data, each key frame of the one or more key frames being a video frame in which an in-frame object is identified;
performing an object detection operation on a first key frame of the one or more key frames to determine object information associated with the first key frame, the object information including object semantic information and object visual information;
determining one or more candidate objects based on the object semantic information;
filtering a first recommended object associated with the first key frame from the one or more candidate objects based on the object visual information;
performing a scenario classification operation on a respective frame of the one or more key frames to determine scenario semantic information of the respective key frame;
determining key frame semantic information of the respective key frame based on scenario semantic information and object semantic information of the respective key frame;
calculating a similarity degree between respective two key frames based on display contents of the respective two key frames and corresponding key frame semantic information of the respective two key frames; and determining at least one key frame associated with the recommended object based on the similarity degree between the respective two key frames and the first recommended object.

2. The method of claim 1, wherein the acquiring the one or more key frames corresponding to the video data includes:
comparing video contents displayed by adjacent video frames in the video data;
determining that a change occurs in the video contents; and
using a video frame corresponding to a video content preceding the change as a candidate key frame.

3. The method of claim 2, wherein the acquiring the one or more key frames corresponding to the video data further includes:
removing repetitive key frames displaying identical content from candidate key frames, to obtain the one or more key frames corresponding to the video data.

4. The method of claim 1, wherein the filtering the first recommended object associated with the first key frame from the one or more candidate objects based on the object visual information includes:
acquiring visual information of a respective candidate object of the one or more candidate objects;
calculating a similarity degree between the visual information of the respective candidate object and the object visual information; and
filtering the first recommended object from the one or more candidate objects based on the similarity degree between the visual information of the respective candidate object and the object visual information.

5. The method of claim 1, wherein the object semantic information includes text description information.

6. The method of claim 5, wherein the determining one or more candidate objects based on the object semantic information includes:
searching a database based on the text description information; and
using an object resulting from the searching as a respective candidate object of the one or more candidate objects.

7. The method of claim 6, wherein the database includes a database of a website.

8. The method of claim 7, wherein the website includes an e-commerce website.

9. The method of claim 1, wherein the object visual information includes a picture.

10. The method of claim 1, wherein the determining the key frame semantic information of the respective key frame further includes:
calculating a term frequency-inverse document frequency (ti-idf) vector of the scenario semantic information and the object semantic information of the respective key frame;
calculating a matrix formed by the vector; and
using a result from the calculating as the key frame semantic information of the respective key frame.

11. The method of claim 1, wherein the calculating the similarity degree between the respective two key frames includes:
calculating a visual similarity degree between the respective two key frames based on the display contents of the respective two key frames;
calculating a semantic similarity degree between the respective two key frames based on the corresponding key frame semantic information of the respective two key frames; and
calculating a key frame similarity degree between the respective two key frames based on the visual similarity degree and the semantic similarity degree.

12. The method of claim 1, further comprising:
acquiring website object information, the website object information including semantic information of a website object and visual information of the website object;
calculating similarity degrees between website objects based on the website object information; and
determining a second recommended object associated with the first key frame based on the similarity degrees between the website objects and the first recommended object associated with the first key frame.

13. The method of claim 12, wherein the website object includes a commodity on an e-commerce website.

14. The method of claim 13, wherein:
the semantic information of the website object is acquired based on text information of the commodity; and
the visual information of the website object is a picture of the commodity.

15. The method of claim 13, wherein the acquiring the website object information includes:
word-segmenting text information of the website object on the e-commerce website;
filtering word-segmented terms based on parts of speech; and
quantizing a filtering result into a tf-idf vector, a matrix formed by the tf-idf vector being the semantic information of the website object.

16. The method of claim 1, further comprising:
calculating key frame similarity degrees between the respective two key frames of the one or more key frames;
calculating website object similarity degrees between website objects; and
determining a third recommended object associated with the first key frame based on the key frame similarity degrees, the website object similarity degrees, and the first recommended object.

17. An apparatus comprising:
one or more processors; and
one or more memories storing thereon computer-readable instructions that, when executed by the one or more processors, cause the one or more processors to perform second acts comprising:
acquiring one or more key frames corresponding to video data, each key frame of the one or more key frames being a video frame in which an in-frame object is identified;
performing an object detection operation on a first key frame of the one or more key frames to determine object information associated with the first key frame, the object information including object semantic information and object visual information;
determining one or more candidate objects based on the object semantic information;
filtering a first recommended object associated with the first key frame from the one or more candidate objects based on the object visual information;
acquiring website object information, the website object information including semantic information of a website object and visual information of the website object;

calculating similarity degrees between website objects based on the website object information; and determining a second recommended object associated with the first key frame based on the similarity degrees associated with the website objects and the first recommended object.

18. The apparatus of claim 17, wherein the acquiring the one or more key frames corresponding to the video data includes:

comparing video contents displayed by adjacent video frames in the video data;

determining that a change occurs in the video contents; and using a video frame corresponding to a video content preceding the change as a candidate key frame.

19. The apparatus of claim 17, wherein the filtering the first recommended object associated with the first key frame from the one or more candidate objects based on the object visual information includes:

acquiring visual information of a respective candidate object of the one or more candidate objects;

calculating a similarity degree between the visual information of the respective candidate object and the object visual information; and filtering the first recommended object from the one or more candidate objects based on the similarity degree between the visual information of the respective candidate object and the object visual information.

20. One or more non-transitory media storing thereon computer-readable instructions that, when executed by one or more processors, cause the one or more processors to perform second acts comprising:

acquiring one or more key frames corresponding to video data, each key frame of the one or more key frames being a video frame in which an in-frame object is identified;

performing an object detection operation on a first key frame of the one or more key frames to determine object information associated with the first key frame, the object information including object semantic information and object visual information;

determining one or more candidate objects based on the object semantic information;

filtering a first recommended object associated with the first key frame from the one or more candidate objects based on the object visual information;

calculating website object similarity degrees between website objects;

calculating key frame similarity degrees between respective two key frames of the one or more key frames; and determining a third recommended object associated with the first key frame based on the key frame similarity degrees, the website object similarity degrees, and the first recommended object.

* * * * *